March 26, 1963    C. O. DENNIS ET AL    3,082,494
MEANS FOR MOLDING CORE MEMBERS
Original Filed Dec. 24, 1958    7 Sheets-Sheet 1

INVENTORS
Clement O. Dennis and
William C. Shaver
BY Mason, Fenwick & Lawrence
ATTORNEYS March 26, 1963  C. O. DENNIS ET AL  3,082,494
MEANS FOR MOLDING CORE MEMBERS
Original Filed Dec. 24, 1958  7 Sheets-Sheet 2

INVENTORS
Clement O. Dennis and
William C. Shaver
BY Mason, Fenwick & Lawrence
ATTORNEYS March 26, 1963  C. O. DENNIS ET AL  3,082,494
MEANS FOR MOLDING CORE MEMBERS
Original Filed Dec. 24, 1958  7 Sheets-Sheet 3

INVENTORS
Clement O. Dennis and
William C. Shaver
BY Mason, Fenwick & Lawrence
ATTORNEYS March 26, 1963

C. O. DENNIS ET AL 3,082,494

MEANS FOR MOLDING CORE MEMBERS

Original Filed Dec. 24, 1958

INVENTORS
Clement O. Dennis and
William C. Shaver

BY Mason, Fenwick & Lawrence
ATTORNEYS

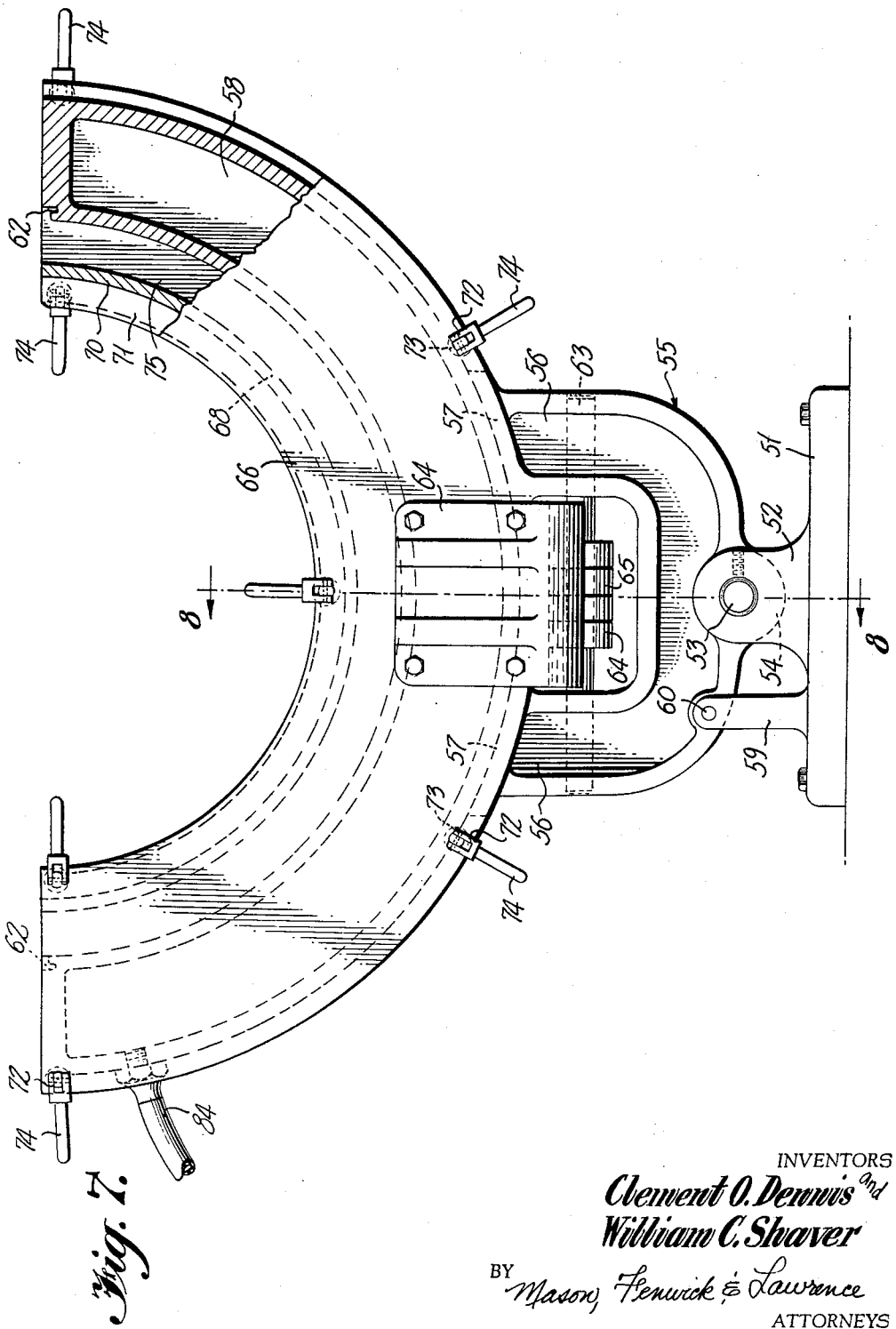

March 26, 1963 C. O. DENNIS ET AL 3,082,494
MEANS FOR MOLDING CORE MEMBERS
Original Filed Dec. 24, 1958 7 Sheets-Sheet 6

INVENTORS
Clement O. Dennis and
William C. Shaver
BY
Mason, Fenwick & Lawrence
ATTORNEYS March 26, 1963  C. O. DENNIS ET AL  3,082,494
MEANS FOR MOLDING CORE MEMBERS
Original Filed Dec. 24, 1958  7 Sheets-Sheet 7

INVENTORS
Clement O. Dennis and
William C. Shaver

BY Mason, Fenwick & Lawrence
ATTORNEYS

United States Patent Office 3,082,494
Patented Mar. 26, 1963

3,082,494
MEANS FOR MOLDING CORE MEMBERS
Clement O. Dennis and William C. Shaver, Macon, Ga., assignors to Poplar Foundries, Inc., Macon, Ga., a corporation of Georgia
Original application Dec. 24, 1958, Ser. No. 784,415, now Patent No. 3,004,313, dated Oct. 17, 1961. Divided and this application July 20, 1960, Ser. No. 44,058
13 Claims. (Cl. 22—13)

This invention relates to a method and means for making cores for use in molding matrices for tire retreading and new tire manufacture.

This is a division of co-pending application Serial No. 784,415, filed December 24, 1958, now Patent No. 3,004,-313, granted October 17, 1961 which is a continuation-in-part of application Serial No. 682,253, filed September 5, 1957, now abandoned.

The complexity of modern tire tread design has necessitated the use of plaster core molding methods for producing matrices for the making of new tires and for duplicating the designs in retreading operations. Modern tire tread is not uniform around the entire circumference. In other words, th design motif is not repeated, but adjacent repeats may vary in circumferential extent from those on either side. There is, however, a certain tread length, known as a pitch sequence, which is repeated a number of times around the tire. As six repeats, or pitches, are most widely used, the repeat described herein will be 60°. This design variation breaks up the vibration rate and cuts down on tire noise.

The usual method of producing a matrix having this type of tread design is to make a master model of hard plaster of one repeat section, or 60° sector, of the tread by hand or machine carving. This must be an exact reproduction. The master is set up in a core box and liquid rubber is poured in to form a rubber negative of the design. The master is removed and stored. While the rubber negative is in the box, a slurry of aerated plaster is poured to form a porous core. When the plaster is set up firmly, but still damp, the core is removed from the box and a plurality of metal sipe blades pressed into the damp, soft plaster at places where fine slits are to appear in the finished design. The sipe blades are left protruding from the core, being imbedded the desired depth of the slits.

Several of these core sectors are made, six if the core is a 60° sector, and the several sections put together to form a circle. The joints must be carefully worked to eliminate the joint line, and the design must undergo hand correction to secure continuity across the joints. Frequently, additional sipe blades have to be inserted to bridge the joints. The core sectors have dried by this time and are hard and brittle. Chipping and breakage are bound to occur.

When the core is complete, it is placed in a mold and metal poured to form a matrix. The metal shrinks about the sipe blades and the blades become fins in the matrix to form the fine slits in the tread design.

This is a time consuming operation, as the core must be broken as soon as the metal has cooled and new core sections must be cast, joined together and worked before another matrix can be cast. It is almost impossible to join and work the sections so that all trace of the joint line disappears. Any imperfection in the core appears in the metal casting. This means additional working before a finished product is obtained.

It is an object of the present invention to provide a method whereby the casting of metal matrices can be materially speeded up, with less cost and an improved end product.

Another object of the invention is to provide a method whereby full circle, or half circle, cores may be produced in quantity without joining several sectors, and thereby eliminating the need to work the resulting joints.

A further object is the provision of means whereby full circle cores, or half circle cores, can be made in a single molding operation.

Still another object is the provision of means which can be used for making a full circle rubber negative and, in turn, full circle cores from the negative.

Yet another object is to provide means for producing full circle cores wherein a lose rubber pattern can be held in place in circular form.

A still further object is to provide means for centrifugally casting plaster against the rubber pattern to prevent air entrapment.

Yet another object is to provide a method whereby the above objects may be achieved in the production of cores for making retreading matrices or matrices for new tire manufacture, and to provide means for producing the cores for matrices to be used in band type or watch case type molds.

Other objects of the invention will become apparent from the following description of practical embodiments thereof, when taken in conjunction with the drawings, which accompany, and form part of, this specification.

In the drawings:

FIGURE 7 is a side elevation of a modified core mold designed to mold cores of half-circle size;

In general, the invention contemplates the construction of a full or half circle master with sipe blades in place, molding a rubber negative of the full extent of the master having slits therein formed by the sipe blades, inserting sipe blades in the slits in the negative and casting a core therefrom transferring the sipe blades to the core. It also contemplates apparatus for making full circle negatives and cores, and half circle negatives and cores.

Figure 1:
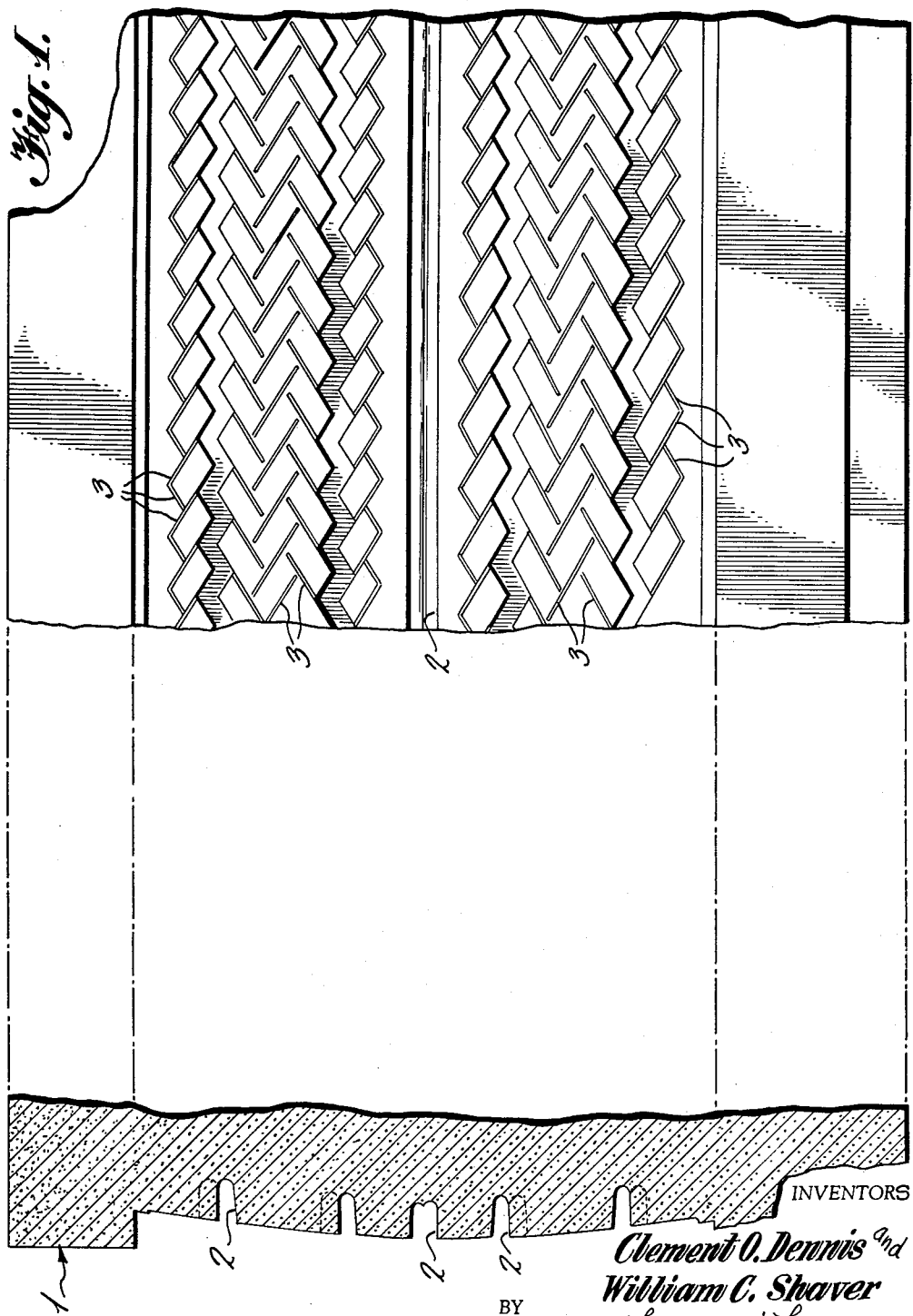
FIGURE 1 is an edge elevation of a master from which pattern negatives for use in making cores for retread or new tire matrices may be made, parts being broken away to show the cross-sectional shape, and a portion of the tread design being shown thereon.
Figure 2:
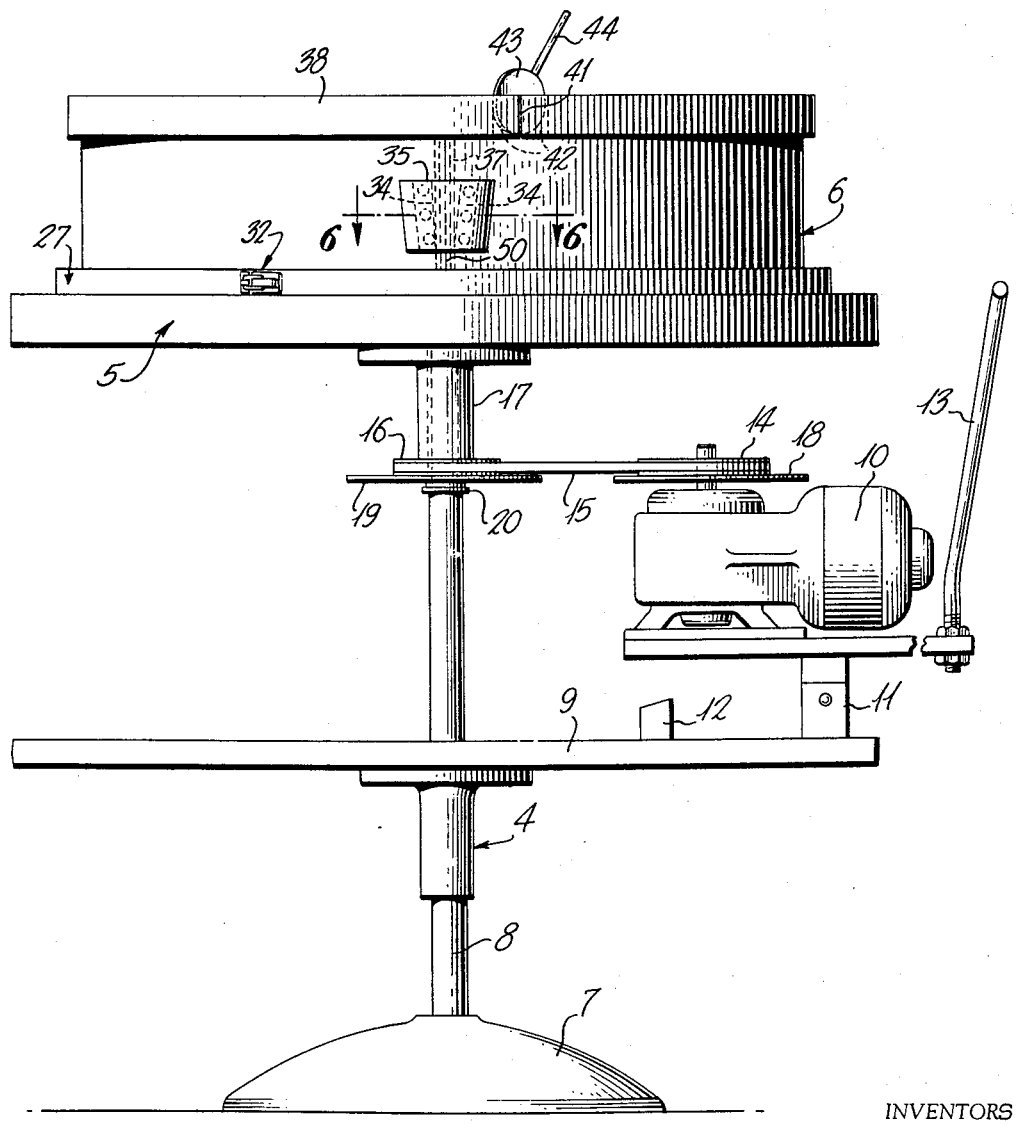
FIGURE 2 is a side elevation of a core mold and its support, to be used in the making of full circle cores.
Figure 3:
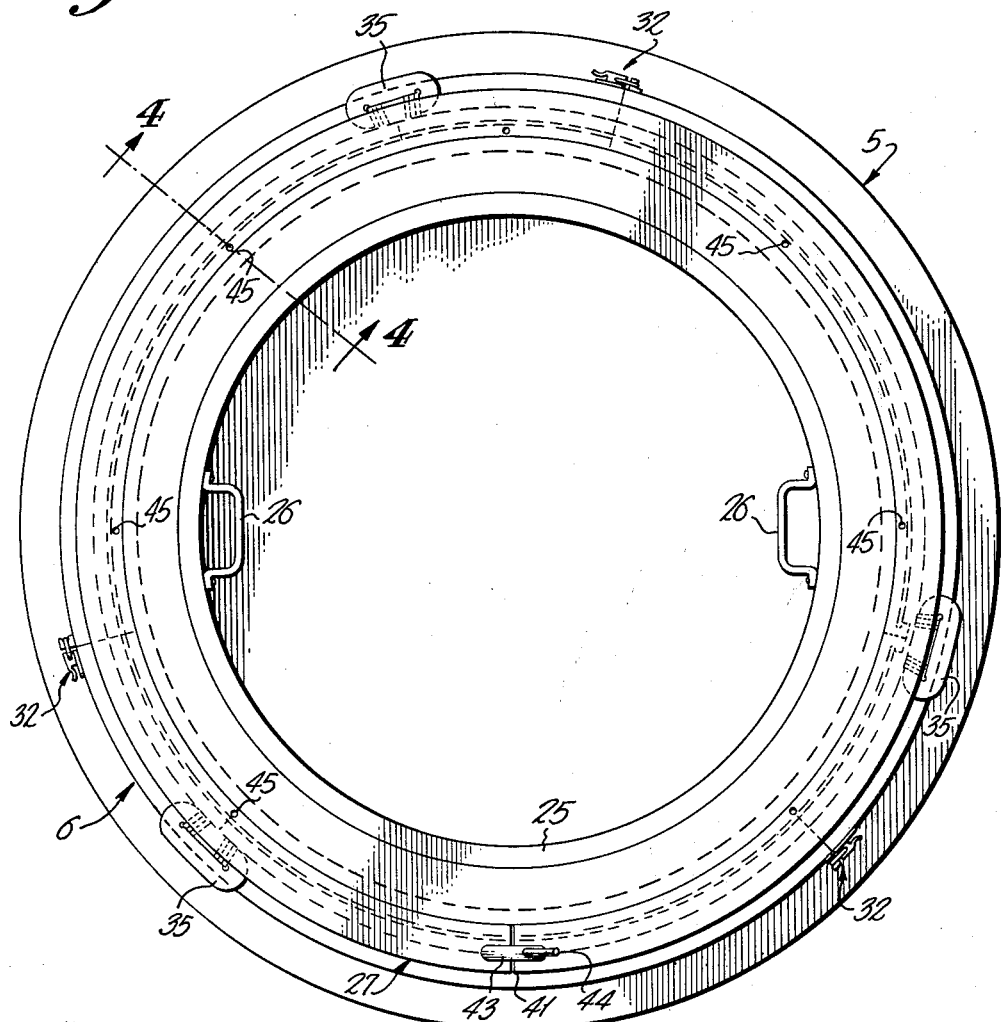
FIGURE 3 is a top plan view of the structure shown in FIGURE 2.

Referring to the drawings in detail, a master of hard plaster is first carved to form with the precise tread design desired. Where slits are to appear in the design sipe blades are inserted, leaving approximately one-half of the blade protruding above the tread surface. The completed master will be in the form of a full circle, as shown in FIGURE 1 at 1. The tread design is indicated at 2 and the sipe blades at 3. The master is put in a suitable core box, such as is shown in the drawings and will be described later, and liquid rubber is poured around it to form a negative pattern. The protruding sipe blades will form slits in the rubber. When the rubber pattern is removed from the mold, it may be laid flat on a table and new sipe blades inserted in the slits formed by the blades on the master. The negative pattern is then put back in the core box and the negative sprayed, or otherwise coated with a film of plaster. This assures close adherence of the plaster, absence of air bubbles and proper delineation of the pattern design in the finished core. The core is then poured and the core box is rotated or oscillated to set up centrifugal forces to cast the plaster against the coated pattern face to eliminate air bubbles. The sipe blades carried by the pattern will become locked in the plaster and form a part of the core C. When the core is hardened, it is removed and put into the matrix mold and the metal is poured. The metal will shrink about the sipe blades and when the core is broken away, the blades will remain as a part of the matrix to form the fins which will make the fine slits in the retreading operation.

By this method, the cores can be cast as integral circles, or any part thereof, and it is unnecessary to locate blade positions and insert blades in the wet plaster cores with the attendant patching and refinishing which this requires.

In order to carry out this method effectively, improved core box structure is provided. This is disclosed for full circle molding of negative patterns and cores and for half circle patterns and cores for the production of matrices for both band type and watch case type molds.

Referring first to the full circle mold, which is shown in FIGURES 2 to 6, inclusive, there is illustrated a supporting stand 4, upon which is mounted a rotatable table 5 for supporting the core mold 6.

The supporting stand includes a base 7 and a pedestal 8, the pedestal being in the form of a vertical column. Column 8 has a horizontal shelf fixed to it, on which a motor 10 is pivotally mounted by means of pivoted brackets 11. The motor has its weight inwardly of the pivotal connection, so that it will tilt toward the central supporting column. A stop 12 is provided on the shelf 9 against which the motor may rest. A handle 13 projects upwardly from the motor mount where it can be grasped to tilt the motor backwardly and raise it off of the stop 12. The motor has a pulley 14 mounted on its shaft, connected by a belt 15 to a pulley 16 fixed to a hub 17 depending from the rotatable table 5. When the motor is tilted rearwardly by manipulation of the handle 13, the belt will be drawn tightly around the two pulleys to transmit the drive from the motor to rotate table 5. When the motor is allowed to tilt forwardly the belt becomes slack. Guards 18 and 19 are mounted beneath the respective pulleys to prevent the belt from dropping away from the pulleys when the belt is slack.

The rotating table assembly is mounted upon thrust bearing 20, fixed to the central column 8, so as to provide for free rotational movement. Table 5 is provided with an upstanding rim 21 which forms an annular shoulder to seat the core mold 6.

The core mold consists of a bottom plate 22 having an outside diameter to permit it to seat upon the table top and fit closely within the recessed portion defined by the rim 21. The bottom plate is rabbeted at both top edges to form an annular outer recess 23 and a similar annular inner recess 24.

Recess 24 forms a seat to receive a cylindrical mandrel 25, which forms the back plate for the molding operation. As this will be a rather heavy member and must be taken out before the cast cores can be removed, it is provided with handles 26. A bottom ring 27 seats in the recess 23 of the bottom plate. This ring is of Z shape in cross-section having an annular, horizontal central section 28 with a downwardly projecting flange 29 at its outer edge and an upwardly directed inner flange 30 at its inner edge. The downwardly projecting flange 29 is of proper thickness to seat in the recess 23 in the bottom plate and position the ring with respect to the bottom plate and the mandrel. The upwardly directed flange 30 is rabbeted in its outer corner providing a recess 31. The bottom ring is formed of several sections for ease in putting it in place and removing it from the mold. The several sections are provided at their opposite ends with interconnecting latch members 32. The latches may be of any appropriate type and are shown as the conventional hook and pivoted link type. The outer cylindrical surface of the upstanding flange 30 of the bottom ring forms a hub or centering disk upon which the outer wall 33 of the core mold may seat. This wall is composed of three arcuate plates, which together form a circle and each plate is provided with a cleat 34 near its end so that the adjacent ends of the wall sections can be joined by means of clamps 35. Grooves 36 are formed on the inner sides of the wall plates 33, extending horizontally around the wall and being spaced apart and parallel to one another. These grooves form part of the rubber pattern holding means as will be described. Two of the wall sections 33 have their vertical inner edges cut away, as clearly seen in FIGURE 6, to form a keyhole slot 37 when the two sections are together. These cut away sections also form part of the negative pattern holding means as will be described. On top of the side walls a top ring 38 is seated. The top ring has an inner circumference equal to that of the bottom ring 27, and has a depending inner flange 39 which fits inside of the side wall 33 and centers the top ring on the mold. The depending flange 39 is rabbeted at its bottom inner corner to form a recess 40, similar to the recess 31 in the bottom ring. The top ring 38 is split, as at 41, and the meeting ends may be separated by a cam 43 which seats in opposite notches 42 in the meeting ends of the ring and is operated by a handle 44. The cam may be turned so that it strikes the opposite faces of the notches 42 to expand the ring and permit it to be freely withdrawn from the molded cores. This completes the construction of the core mold.

After the hard plaster master model 1 has been completed, it can be set upon a table and the bottom ring sections 27 set up in place about it and clamped together. The three outer wall sections of the mold can then be fitted against the outer periphery of the upstanding flange 30 of the bottom ring sections, and they also will be clamped together. The top ring is then put in place seating upon the top edge of the outer wall sections. The top ring is provided with a plurality of pouring openings 45 so that rubber can be poured into the space between the side walls 33 and the master 1. The pouring will be continued until the space is completely filled. The rubber, of course, will conform to the design cut on the face of the master and about the projecting sipe blades. It will flow into the annular channels 36 in the side walls, forming stiffening and positioning ribs 46 along the back face of the rubber pattern. At the same time, it will flow into the recess 31 between the bottom plate and the side wall forming a lower flange 47. It will also fill up the recess 40 between the top plate and the side walls to form a flange 48. The entire pattern 49 will have the cross-sectional appearance shown in FIGURE 5, which also illustrates the relative positions of the several parts during the pouring of the rubber pattern. The pattern so formed will have the entire tread face pattern of the tire and is for use in making cores for band type mold matrices.

Figure 6:
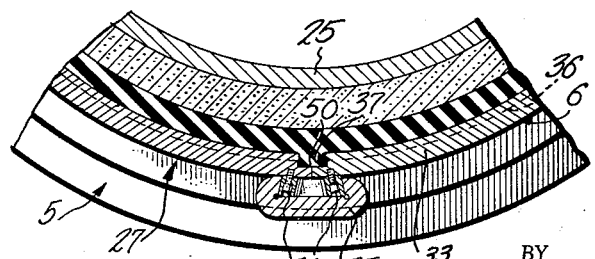
FIGURE 6 is a horizontal section through a portion of the outer rim of the core mold and is taken on the line 6—6 of FIGURE 2.
Figure 4:
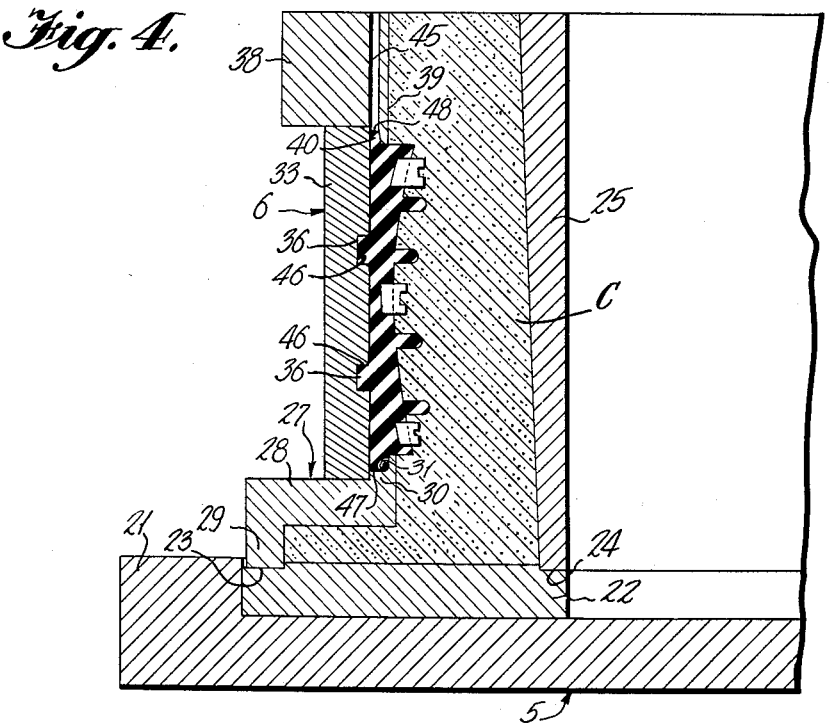
FIGURE 4 is an enlarged vertical section through one side of the core mold and its supporting table, the parts being arranged for the casting of cores, and is taken on the line 4—4 of FIGURE 3.
Figure 5:
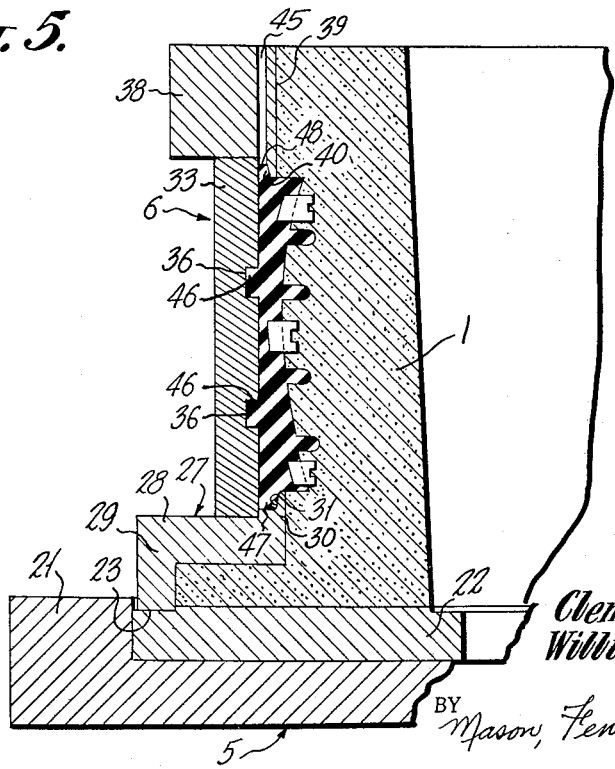
FIGURE 5 is a view similar to FIGURE 4 with the apparatus set up for pouring a rubber negative pattern from a master.

It will be noticed from FIGURE 6 that the rubber also fills up the keyhole slot 37 formed by the cut away portions of the meeting ends of two of the wall sections, so that the rubber is keyed to the wall sections at this point. To remove the pattern, the upper ring 38 is lifted off and the wall sections 33 are unclamped and taken away. Of course, it will be easy to remove the keyed sections of the side wall as they separate at the center line of the keyhole slot and at their other lines of separation previously described. After these parts of the mold have been removed, the rubber negative is slit from top to bottom, centrally of the extended portion which seats within the keyhole slot, along the line indicated at 50 in FIGURE 6. The pattern may then be stripped from the circular mold. The rubber pattern is then laid out on a table as previously described, and the slits formed by the sipe blades of the master will be filled with new sipe blades for the making of the core.

The mold is then set up on the table 5, the bottom plate 22 is positioned, and the bottom ring sections are put in place and clamped together. The wall sections 33 are set up and clamped, and the rubber negative with the sipe blades in place is put into the form with its bottom flange 47 seated in the recess 30 of the bottom ring and the ribs 46 pressed firmly into the annular channels 36 of the outer walls. The top ring 38 is then put in place and its recess 40 fits over the top flange 48 of the rubber pattern, tightly engaging the pattern around its upper edge and holding it against the outer wall. Thus, the pattern is held against the outer wall at top and bottom and is braced and supported by the ribs seating in the wall channels. As a next step in the procedure, the inner face of the pattern is sprayed with a plaster, so that a thin coating of plaster is formed over the entire inner surface. As previously described, this is to prevent the entrapment of air bubbles. When a coating of sufficient thickness has been built up, the mandrel 25 is put in place and seated in the annular recess 24 in the bottom plate. The mold is now ready for pouring the plaster core.

Before pouring begins, the motor 10 is started and tilted backwardly, so as to tighten the belt 15 and begin rotation of the table 5 and the core mold. As soon as rotation is begun, plaster is poured in the open top of the mold between the mandrel and the rubber negative. Pouring is continued until the mold is filled.

The motor is then stopped and the plaster is allowed to harden. After the core C has set the top ring of the mold can be expanded and removed and the several sections of the side wall taken off individually. The rubber pattern is peeled away from the core leaving the sipe blades imbeded in the newly cast core. The bottom ring sections can then be disconnected and removed. The mandrel may have to be tapped several times to free it from the new core, but it can then be slipped out of the core. The core, after curing, is ready for use in casting a metal matrix.

It is to be noted particularly that the core box structure is such that a loose rubber negative pattern can be inserted and held with substantial rigidity firmly against the annular walls of the mold, and the two ends of the split pattern will be held in juxtaposition by reason of their hooklike ends fitting into the recessed sections of the keyhole slot 37. Thus, the pattern is held immovable. This permits the molding of full circle cores and the free removal of the pattern from the core after molding.

Figure 8:
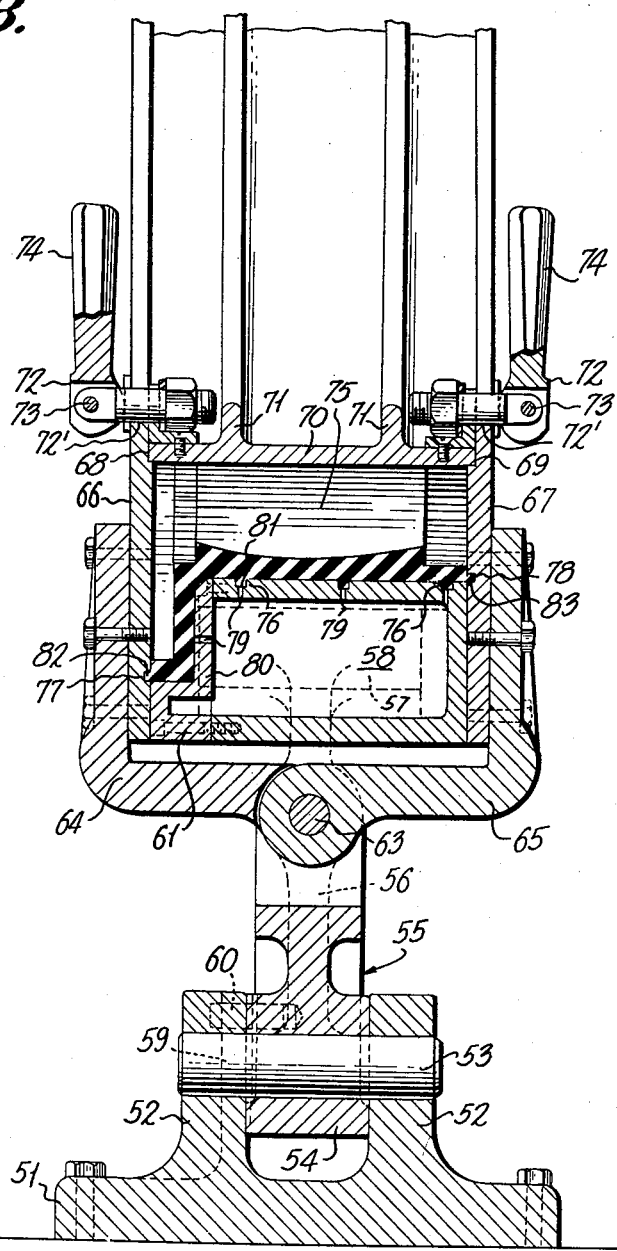
FIGURE 8 is a vertical section through the mold shown in FIGURE 7, taken on the line 8—8 of FIGURE 7.

In FIGURES 7 and 8 a modified form of the core box is shown for the casting of cores which are of half-circle extent. While half-circle cores are not as satisfactory as the full circle method previously described, they are far superior to the multiple section cores previously in use.

In this modification, there is a base 51 having a pair of upstanding ears 52. The ears are apertured to receive pivot shaft 53, which also passes through the hub 54 of a yoke 55. The yoke has a pair of upstanding arms 56 which have seating pads 57 at their upper ends.

Seated upon the pads 57 is a semi-circular manifold 58. The manifold is seated so that it is symmetrical with respect to the yoke, and the center line of the manifold will pass through the center of the yoke and the pivot pin 53. This assures proper balance and also assures that the upper ends of the manifold lie in the same horizontal plane when the device is in an upright position. A lug 59 projects upwardly from the base, and a pin 60 passes through openings in the lug and the yoke to lock the structure against rocking movement about the pin 53.

The manifold is U-shaped in cross-section, with the legs of the U extending horizontally, and a cap plate 61 fits against the ends of the legs forming a side plate to bridge the open side of the manifold. The cap plate is offset for a purpose which will be described. The cap plate has the same arcuate extent as the manifold. The top inner edges of the manifold are cut away and recessed as at 62 with the recess being much the same shape as the ends of the side wall sections forming the keyhole slot in the form previously described. These will receive the hook-like ends of the rubber negative.

The arms of the yoke 55 are drilled at right angles to the opening for the pivot pin 53, to receive the hinge pin 63. A pair of hinge elements 64 and 65 are mounted on the hinge pin and carry the side plates 66 and 67 of the mold. The side plates are also semi-circular in shape and extent. The plates are rabbeted on their inner faces to form recesses 68 and 69 to seat a semi-circular inner wall plate 70. Plate 70 may have stiffening ribs 71 on its back. Studs 72 will be connected to the inner wall member 70 to project outwardly through notches 72' formed in the side plates. The upper ends of the bolts will be apertured to receive pins 73 for affixing cam levers 74 to the bolts. A washer will be put on each bolt before the cam lever is put in place to bear upon the surface of the side plate under the cam action to lock the side plates and inner wall securely together. As many of these cams as may be needed can be supplied. Similar locking cams can be affixed to the manifold and manifold cap to lock the other edges of the side plates tightly against the sides of the manifold and cap.

Referring to FIGURE 8 in particular, a master, having a cross-section such as that shown in FIGURE 1, will be placed in the mold cavity 75 and rubber will be poured into the space between the master and the manifold. The pouring can be done from the top of the mold on either side of the semi-circular mold. The pouring will continue until the recess is filled. It will be noticed that the inner face of the manifold is provided with arcuate grooves 76 and that the side plates 66 and 67 are provided with grooves 77 and 78 closely adjacent the inner edges of the manifold and cap and conforming in shape thereto. The rubber of course will fill these grooves.

After the rubber negative has been formed, the master and the rubber pattern will be removed from the mold. The pattern will have its complement of sipe blades put in place and it will be inserted in a mold ready for casting cores. When the mold is to be used for casting the cores, it will be provided with a plurality of holes 79 through the manifold from the grooves 76 to the interior, and also through the wall 80 of the cap member. With the side plates open and the inner wall member removed, one end of the rubber pattern is hooked over a recess 62 at the end of the manifold and the rubber is pressed firmly against the inner side of the manifold pressing the ribs 81 into the channel 76 in the manifold. The opposite end of the rubber will be hooked into the other recesses 62. The offset portion of the cap plate 61 and the ribs 81 will serve to position the pattern laterally of the mold. The side plates will then be swung upwardly about the hinge pin 63, bringing them into position against the sides of the manifold. End flanges 82 and 83 on the pattern will fit within the grooves 77 and 78 in the side plates. This will positively position the side edges of the pattern relative to the mold. The inner wall 70 will then be put in place, and the cam clamping members 74 tightened down. It will be understood that before the inner wall is put in position the inner face of the pattern will be sprayed with plaster as in the method previously described. After the mold is locked up, the manifold is opened to a suitable source of vacuum through an outlet 84 and the pull of the vacuum through the numerous openings 79 will draw the negative tightly against the manifold wall and hold it snugly in place throughout its full length. Pouring can then begin and continue until the mold is about half full. The pin 60 is then withdrawn and the mold chamber is rocked about its pivot 53, causing the plaster to flow back and forth within the mold chamber, dispelling any air bubbles which may be within the chamber. The pin is then put back into place to lock the mold against movement, and the pouring is completed. When the core is completely set up the mold can be unlocked, the sides let down, the inner wall removed and the casting taken out. Here again the sipe blades which were held by the slits in the rubber pattern will be imbedded in the plaster core.

Figure 9:
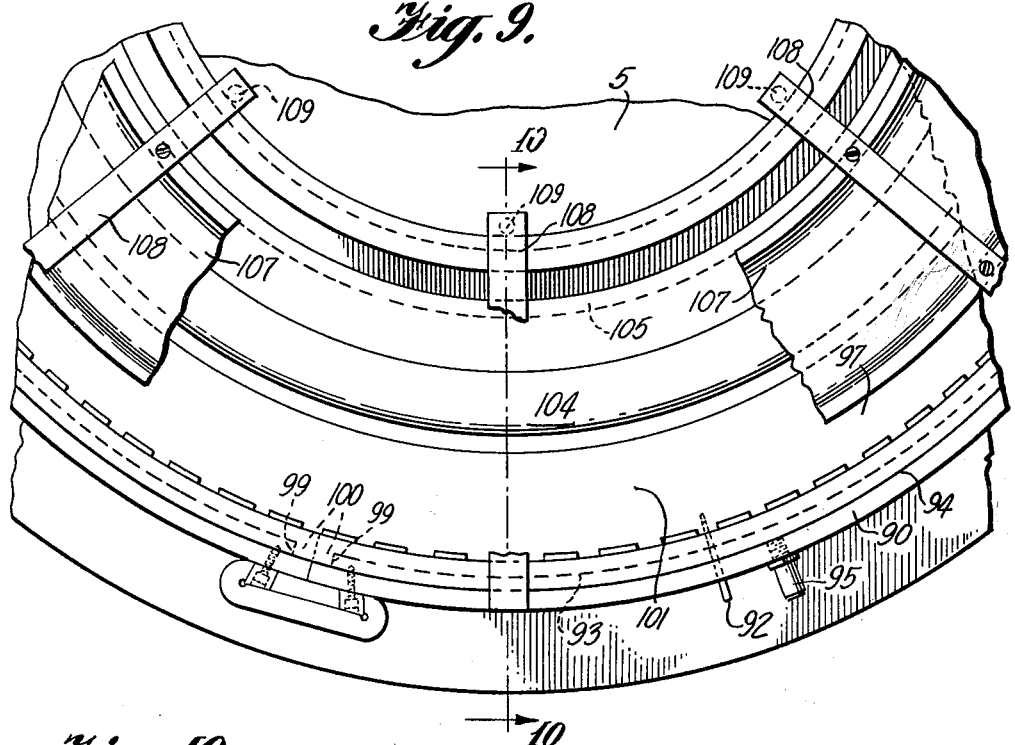
FIGURE 9 is a partial plan view of a further modified mold structure, for use in casting core molds for matrices to be used in watch case type molds.
Figure 10:
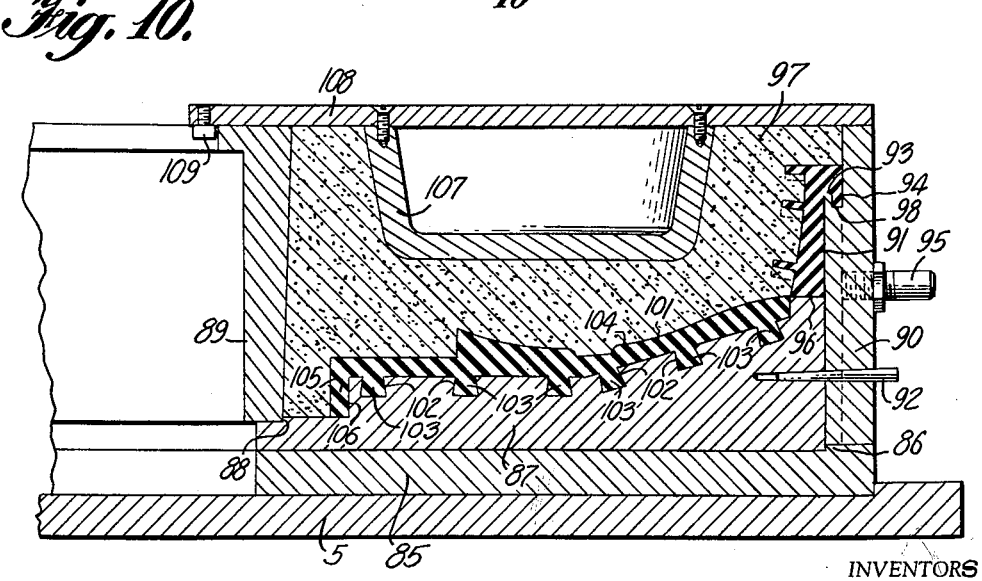
FIGURE 10 is a section through the structure shown in FIGURE 9, taken substantially on the line 10—10 of FIGURE 9.

In FIGURES 9 and 10 another form of the invention has been shown wherein the cores cast are for use in making matrix sections for watch case type molds for retreading or for the making of new tires. In this form, the cores will be of such size and shape that the tread matrices formed by their use will be but half the width of the tire tread face as is customary in watch case type mold equipment. This form also provides means for the formation of matrix patterns and cores which include side wall forming sections.

The structure is somewhat similar to those previously described, and includes an annular base plate 85 adapted to seat upon the table 5 so that the mold may be rotated. The base plate has an outer raised rim 86 which defines a seat to receive a side rubber-holding plate 87. The plate 87 seats flush on the base plate 85 and is rabbeted around its upper inner edge to provide a shoulder 88 to position the circular inner mandrel 89 concentric to the base and side rubber-holding plates. A back-up outer ring 90 seats upon the rim 86 of the base plate and about the outer surface of the side rubber-holding plate 87. The back-up ring may be made in several sections joined together as in the previously described embodiments. As the back-up ring will position the rubber tread pattern 91, it is necessary that the back-up ring and side rubber-holding plate 87 be properly oriented relative to one another so that the tread and side wall patterns will be in correct registry. To accomplish this, the side rubber-holding plate and back-up ring are suitably drilled with registering openings, and tapered locating pins 92 are inserted in the openings to hold the respective parts in alignment. It will be noted that the upper portion of the inner wall of the back-up ring is offset with respect to the lower portion and that the step 93 between the two is provided with a channel 94. This will form a holding means for the rubber tread pattern, as will be described. Suitable trunnions 95 may be connected to the outer ring to provide means for handling the mold.

In using the mold shown in FIGURES 9 and 10, a master pattern is first used to obtain the rubber patterns, as was done with the previously described structures. In this embodiment, tread pattern 91 is formed in a cavity provided between the master pattern, the outer ring 90 and an upstanding rim 96 at the upper outer corner of the side rubber plate 87. The inner edge of the rim will contact the master pattern to close the tread rubber pattern cavity in precisely the same manner as the cast core 97 contacts the rim edge in FIGURE 10. The rubber pattern 91 will have an annular depending flange 98 to seat in the channel 94 to hold the pattern close against the outer ring 90. The outer ring will be provided with suitable vertical channels 99 to provide seats for locking hooks 100 on the ends of the tread pattern 91, similar to the previously described forms.

The upper face of the side rubber plate 87 is contoured as desired to form the back of the side wall rubber pattern 101. A plurality of annular channels 102 may be recessed in the plate to form stiffening and positioning ribs 103 on the back of the rubber pattern when molding and to receive these ribs to position the pattern when casting cores. The upper face 104 of the pattern may carry any suitable side wall design. An inner depending annular flange 105 will lie against a shoulder 106 on the plate 87 to rigidify and position the pattern.

In order to decrease the weight of cores made in the mold, and to decrease the core thickness to aid in drying the cores, an annular plug 107 may be used to hollow out the back. The plug may be of simple channel construction and can be supported by a plurality of bars 108 which span the space between the mandrel 89 and the outer back-up ring 90. As many of these bars as may be necessary will be used. Any appropriate means may be used to centrally position the plug, such as screw heads or other suitable projections 109 which will contact the inner edge of the mandrel 89.

In molding the cores, the mold will be positioned as shown in FIGURE 10 so that a better filled out core can be obtained and no air will be trapped against the side wall rubber pattern. The core is inverted, however, when used in the mold for casting the metal matrices.

It will be obvious that if it is desired to mold cores for use in casting tread matrices only, a substitute for the side plate 87 may be used which will be approximately the size and shape of the plate 87 and the rubber pattern 101. Of course, the substitute plate will have no side wall pattern.

While in the above, practical embodiments of the invention have been disclosed, it will be understood that the details of construction described and shown are merely by way of illustration and the invention may take other forms within the scope of the appended claims.

What is claimed is:

1. Apparatus for molding plaster cores comprising, a core box having a base plate having spaced inner and outer concentric grooves thereon, a bottom ring seatable in the outer groove of the base plate and having an annular upwardly directed flange, said flange being rabbeted around its upper outer edge, a cylindrical outer wall seatable upon the bottom ring and about said flange, an upper ring having a depending annular flange to fit within the upper end of the cylindrical wall, said depending flange being rabbeted around its lower outer edge, the rabbets of the two said flanges forming with the cylindrical wall upper and lower annular grooves coextensive with the inner surface of the cylindrical wall, a flexible pattern coextensive with the inner surface of the cylindrical wall and having top and bottom flanges seated in said upper and lower grooves to hold the pattern against the cylindrical wall, said pattern being split vertically and having hook-like elements at its split ends, said cylindrical wall having a vertical groove in its inner face to receive the hook-like elements to prevent endwise movement of the pattern, and a circular mandrel seated in the inner groove for the base plate.

2. In apparatus for molding plaster cores as claimed in claim 1, a rotatable support for the core box, and means to rotate the support.

3. Apparatus for molding plaster cores comprising, a core box having an annular side wall pattern support plate recessed on its upper surface to provide a seat for a flexible side wall pattern with the upper edge of the pattern being flush with the top surface of the support plate, means on the plate to hold the pattern to the plate, a cylindrical outer wall having an inner surface the diameter of the outer diameter of the support plate to fit around the support plate and be positioned thereby, means on the outer wall to secure a flexible tread pattern against the inner surface of the wall and seated upon the upper face of the support plate and against movement longitudinally and transversely of the tread pattern, the width of the annular surface of the support plate from the wall to the seat in the support plate being equal to the thickness of the tread pattern whereby the adjacent edges of sidewall and tread patterns placed in the box will be in abutment to form a continuous mold cavity wall.

4. Apparatus for molding plaster cores comprising, a core box having an arcuate wall with a concavely arcuate surface, end members seatable against the arcuate ends of the wall and projecting inwardly beyond the concave surface of the wall, a flexible rubber pattern the full length and width of the concave surface of the wall seatable against the concave surface of the wall, companion interengageable means formed in the wall and on the ends of the pattern to hold the pattern against movement arcuately of the concave surface to maintain full coverage of the arcuate extent of the concave surface by the pattern, the end members having grooves adjacent the arcuate surface of the wall concentric to the concave curvature of the wall, and flanges projecting from the side edges of the pattern to seat in the grooves to hold the pattern firmly against the concave wall surface.

5. In apparatus for molding plaster cores as claimed in claim 4, said means for holding the ends of the pattern comprising hook-like elements on the ends of the pattern and at least one recess in the concave surface of the wall to receive the hook-like elements.

6. In apparatus for molding plaster cores as claimed in claim 4, vacuum means opening through the concave surface of said wall to draw the intermediate portions of the pattern against the wall.

7. In apparatus for molding plaster cores as claimed in claim 4, said arcuate wall being a cylinder.

8. Apparatus for molding plaster cores comprising, a support, a table rotatably mounted on the support, a core box mounted on the table, the core box having an outer wall with an inner circular surface and having end members seatable against the ends of the outer wall and projecting inwardly beyond the circular inner surfaces of the wall, an elongated flexible rubber pattern the length of the inner surface of the wall, interengageable means on the ends of the pattern and in said wall to hold the pattern against movement arcuately of the circular surface, the end members having circular grooves adjacent the circular surface of the wall, flanges on the side edges of the pattern to seat in the circular grooves to hold the pattern against the circular wall surface throughout the full extent of the surface, and means to rotate the table.

9. In apparatus for molding plaster cores as claimed in claim 8, one of the end members being an annular base plate resting upon the table and having seats around its inner and outer peripheries, a bottom ring in the outer base plate seat upon which the outer wall seats, the other of said end members being a top ring seated upon the outer wall, and an inner circular wall seated upon the inner peripheral seat of the base plate.

10. In apparatus for molding plaster cores as claimed in claim 9, said interengageable means comprising, a vertical groove in the outer wall and hook-like elements at the ends of the pattern to engage the vertical groove.

11. Apparatus for molding plaster cores comprising, a base, a semi-circular core box including spaced side walls joined by a semi-circular outer wall, the core box being pivotally mounted midway between its ends on the base, a flexible rubber pattern, interengageable means at the ends of the semi-circular outer wall and on the ends of the pattern to hold the pattern against movement arcuately of the semicircular wall, grooves in the side walls adjacent the outer wall concentric to the outer wall, and flanges on the side edges of the pattern to seat in the grooves to hold the pattern against the outer wall from end to end.

12. In apparatus for molding plaster cores as claimed in claim 11, vacuum means opening through the outer wall of the core box to draw the pattern tightly against the outer wall.

13. Apparatus for molding plaster cores comprising, a core box including a channel section having spaced parallel walls and an arcuate wall bridging between the parallel walls, the arcuate wall having a concavely arcuate seating surface, an elongated flexible rubber negative pattern to seat upon and cover the concavely arcuate surface of the core box wall, hook-like elements at the ends of the pattern and at least one recess in the arcuate wall extending transversely to the arcuate extent of the wall to receive the hook-like elements at the pattern ends to hold the pattern against movement arcuately of the wall, arcuate grooves in the spaced parallel walls of the core box adjacent and concentric to the seating surface of the arcuate wall, and flanges on the side edges of the pattern to seat in the grooves to hold the pattern from end to end against the seating surface of the core box wall.

References Cited in the file of this patent

UNITED STATES PATENTS

| | | |
|---|---|---|
| 2,494,405 | Olsen et al. | Jan. 10, 1950 |
| 2,618,031 | Mazer | Nov. 18, 1952 |
| 2,708,776 | Heintz | May 24, 1955 |
| 2,781,565 | Atchison | Feb. 19, 1957 |
| 2,946,104 | Martin | July 26, 1960 |